United States Patent [19]

Rast, Jr. et al.

[11] 3,760,256
[45] Sept. 18, 1973

[54] SYNCHRONOUS DC POWER SUPPLY

[75] Inventors: Gustaf J. Rast, Jr.; Thomas A. Barley, both of Huntsville, Ala.

[73] Assignee: The United States of America as represented by the Secretary of the Army

[22] Filed: July 31, 1972

[21] Appl. No.: 276,501

[52] U.S. Cl..................... 321/9 R, 321/10, 321/16, 321/47
[51] Int. Cl. .......................................... H02m 1/12
[58] Field of Search..................... 321/2, 9 R, 10, 47

[56] References Cited
UNITED STATES PATENTS
3,621,361 11/1971 Barth ..................................... 321/2
3,248,640 4/1966 Wellford ........................... 321/47 X
3,659,185 4/1972 Gregorich .............................. 321/2
3,670,234 6/1972 Joyce ..................................... 321/2

*Primary Examiner*—William M. Shoop, Jr.
*Attorney*—Harry M. Saragovitz et al.

[57] ABSTRACT

A synchronous direct current (dc) power supply has the power supply input drive synchronized with the pulse repetition frequency (PRF) of the amplifying or load circuit requiring the dc power for operation. This limits the occurrence of ripple components in the power supply output to the spectral positions of the PRF lines, eliminating ripple interference with signal processing in the load. An astable multivibrator is synchronized with the PRF generator output frequency. The multivibrator output is converted to a square wave, filtered, and processed to provide a fully rectified output voltage for coupling to the desired load circuit.

5 Claims, 1 Drawing Figure

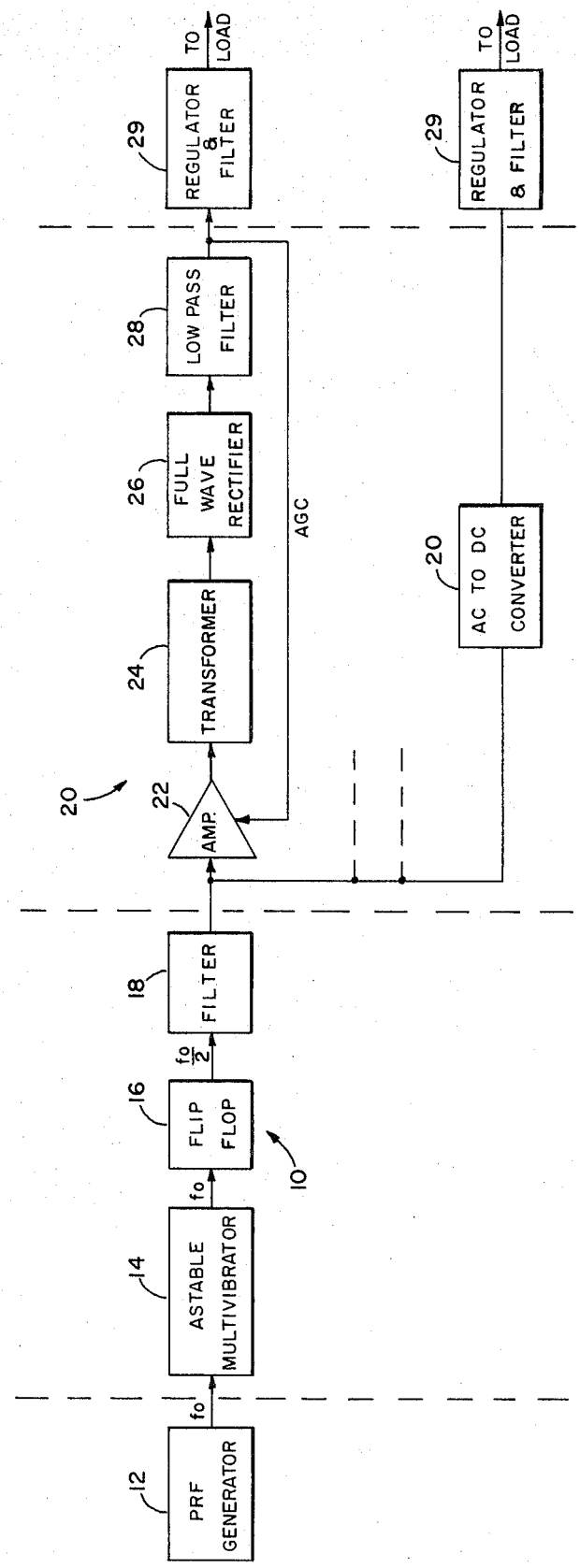

SYNCHRONOUS DC POWER SUPPLY

BACKGROUND OF THE INVENTION

The rectified output of a power supply contains fluctuation or pulsating current at frequencies which must often be filtered out or otherwise compensated for in using circuitry. This pulsating current level is the alternating current component of the rectified voltage known as ripple or ripple frequency. In radio frequency power supplies the ripple component causes spectral response to exit in the radio frequency device requiring a dc power source, resulting in interference with signal processing in the using circuitry.

SUMMARY OF THE INVENTION

In this direct current power supply the high frequency output of a multivibrator is synchronized to the pulse repetition frequency of the circuit requiring the dc power for operation. This synchronized output signal is amplified and rectified to produce the dc output power to the load. Preset radio frequency amplifying devices produce spectral lines spaced at multiples of the pulse repetition frequency (PRF) when they are pulsed and signal processing apparatus is designed to reject these spectral zones. The ripple components present in the dc output power and occurring in these spectral zones are also rejected and will not interfere with signal processing in the load. Further, the relatively high frequency of the PRF allows spurious low frequency harmonics from undesired sources to be easily eliminated with band pass filters prior to rectifying the higher PRF signal for generation of dc power. A very clean spectral response results with significant ripple components only at the PRF spectral positions.

BRIEF DESCRIPTION OF THE DRAWING

The single FIGURE is a block diagram of a preferred embodiment of the synchronous dc power supply.

DESCRIPTION OF THE PREFERRED EMBODIMENT

The synchronous dc power supply eliminates ripple interference with signal processing operations of using circuitry such as a radar transmitter by synchronizing ripple components of the power supply with the PRF of the using circuitry. The pulse repetition frequency (PRF), also known as the pulse recurrence frequency or pulse repetition rate, is by definition the number of times per second that a pulse is transmitted. The ripple components of a dc power supply will modulate a klystron oscillator or traveling wave tube amplifier which produces undesirable noise content in the transmitted signal spectrum. If these noise-like spectral lines occur at the PRF of the transmitter, they occur at existing target blind-velocities of the radar. This will cause no additional interference since a radar is blind to a target at that specific velocity, thus making any added spectral noise inconsequential. Synchronizing the ripple frequency to the transmitter PRF also reduces the filtering requirements on the power supply to block unwanted ripple. The radar's blind velocities can also be eliminated by producing a staggered PRF. By properly synchronizing the power supply input frequency to the PRF, the fundamental ripple frequency and all harmonic ripple frequencies become synchronized with the PRF fundamental and harmonic frequencies.

For very stable, highly regulated, direct current power sources, the ripple voltages which cause primary interference are the lower order Fourier components that generate first order pulse modulation (PM) sidebands, such as may be generated in a klystron or traveling wave tube. Locking the power supply input frequency to the PRF generator eliminates random frequency drift between the PRF spectral lines and the PM sidebands produced by power supply ripple components.

As shown in the drawing, an embodiment of the direct current synchronous power supply includes an ac power source 10, having an input coupled from a pulse repetition frequency generator 12 and an output coupled to an ac-to-dc converter 20. In power source 10 an astable multivibrator 14 is connected to the input PRF signal and has an output coupled to a flip-flop 16. The square wave output of flip-flop 16 is coupled to a filter network 18 where it is made sinusoidal and connected as the input to converter 20. Converter 20 comprises a series connected amplifier 22, transformer 24, full wave rectifier 26, and low-pass filter 28. The output from filter 18 is connected to amplifier 22 and the output from low-pass filter 28 is coupled to a regulator and filter circuit 29 for distribution to the particular load circuit being supplied. Feedback is connected from the output of filter 28 to amplifier 22 for providing automatic gain control. Transformer 24 is selectable, depending on the voltage and current requirements of the load. As shown, a plurality of ac-to-dc circuits 20 and regulators 29 may be connected to the output of filter 18 for providing a broad spectrum of dc supply voltages from a single high frequency source.

In operation, a high frequency trigger pulse is supplied to multivibrator 14 for synchronizing the multivibrator output with the output of PRF generator 12. The astable multivibrator is synchronized only to the PRF and if the PRF is not supplied, changed to a different frequency, or temporarily interrupted there is no power loss since the multivibrator will continue functioning as a free running multivibrator. The output of multivibrator 14 drives flip-flop 16 at PRF rate $f_0$, providing an accurate square wave output to filter 18 at one half the $f_0$ rate. Filter 18 converts the square wave to a sine wave and feeds amplifier 22. Amplifier 22 increases the power of the input signal to a desired level, driving transformer 24, rectifier 26, and filter 28 to provide a dc voltage level at a current appropriate to supply regulator 29. The regulator-low-pass filter circuit 29 provides the desired regulated output voltage level within the ripple limits of the load.

In pulsed, high frequency equipment such as those including klystrons and traveling wave tubes, acceptable ripple levels in the power sources are impractical to achieve even for 720 hertz fundamental ripple input to the filter. Higher frequencies are more easily filtered from the dc output voltage. As the fundamental frequency is increased fewer spectral lines interfere with the doppler spectrum of the radar. For example with a 5 KHz fundamental frequency, PRF, only the first two spectral lines interfere in a doppler spectrum of zero to approximately 15 KHz. Using a higher frequency, not harmonically related to 60 Hz, reduces problems associated with additive power line harmonics which can increase the undesired spectral lines.

Obviously, modification and variation of the present invention is possible in light of the above teaching. For example, the PRF generator may be connected through a gate circuit directly to flip-flop 16 instead of being connected to multivibrator 14. The multivibrator, being free running, may be connected to another input of the gate circuit. A sensor responsive to the pulses of the PRF generator is coupled to the gate circuit for determining which input signal is coupled to the flip-flop. Thus, if the PRF signals are lost the sensor enables the gate circuit to couple the multivibrator output to the flip-flop. When the PRF signals are restored the sensor restores to the original state. It is therefore to be understood that within the scope of the appended claims the invention may be practiced otherwise than as specifically set forth therein.

We claim:

1. A synchronous dc power supply for supplying an output signal having ripple components synchronous with a predetermined input signal and comprising: a high frequency alternating current power source having an input and an output, an ac-to-dc converter having an input connected to the output of said power source and an output for coupling to a load circuit, and a pulse repetition frequency generator coupled to said power source input for coupling said predetermined input signal thereto.

2. A synchronous dc power supply as set forth in claim 1 wherein said ac power source comprises a multivibrator having an input coupled as said power source input and an output, a flip-flop coupled to the output of said multivibrator for providing a square wave drive signal, a filter connected to receive said drive signal for converting said square wave to a sine wave, and an output of said filter being coupled to said converter input.

3. A synchronous dc power supply as set forth in claim 2 wherein said multivibrator is astable and said converter comprises an amplifier, a transformer, a rectifier, and a low-pass filter; the output of said amplifier being coupled as a transformer input, the transformer output being coupled to said rectifier and the output of said rectifier being coupled to said low-pass filter; the input of said converter being connected as an input to said amplifier and the output being coupled from said low-pass filter to load circuitry.

4. A synchronous dc power supply as set forth in claim 3 wherein said rectifier is full wave and the output of said low-pass filter is coupled back to said amplifier for providing automatic gain control thereto.

5. A synchronous dc power supply as set forth in claim 4 and further comprising a plurality of ac to dc converters connected to said power supply filter output for providing predetermined voltage level output signals.

* * * * *